(12) United States Patent
Pearson

(10) Patent No.: US 6,248,255 B1
(45) Date of Patent: *Jun. 19, 2001

(54) CENTRIFUGAL COMPRESSION REFRIGERANT COMPOSITION

(75) Inventor: Stephen Forbes Pearson, Glasgow (GB)

(73) Assignee: Star Refrigeration Limited (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/068,367
(22) PCT Filed: Nov. 7, 1996
(86) PCT No.: PCT/GB96/02733
  § 371 Date: Jul. 16, 1998
  § 102(e) Date: Jul. 16, 1998
(87) PCT Pub. No.: WO97/17414
  PCT Pub. Date: May 15, 1997

(30) Foreign Application Priority Data

Nov. 7, 1995 (GB) .................................................. 9522701

(51) Int. Cl.$^7$ .................................................. C09K 5/04
(52) U.S. Cl. ............................................. 252/67; 62/114
(58) Field of Search ................................ 252/67; 62/114

(56) References Cited

U.S. PATENT DOCUMENTS

| | | | |
|---|---|---|---|
| 4,810,403 | * 3/1989 | Bivens et al. | 252/67 |
| 5,076,064 | * 12/1991 | Kopko | 62/77 |
| 5,135,054 | * 8/1992 | Nimitz et al. | 252/2 |
| 5,182,040 | * 1/1993 | Bartlett et al. | 252/67 |
| 5,650,089 | * 7/1997 | Gage et al. | 252/67 |
| 5,733,472 | * 3/1998 | Minor et al. | 252/67 |
| 5,766,511 | * 6/1998 | Musso et al. | 252/305 |
| 5,792,382 | * 8/1998 | Gu | 252/67 |

FOREIGN PATENT DOCUMENTS

| | | | |
|---|---|---|---|
| 0427604 | * 5/1991 | (EP) . | |
| 0 509 673 A1 | 10/1992 | (EP) | C09K/5/04 |
| 0565265 | * 10/1993 | (EP) . | |
| 0 607 822 A1 | 7/1994 | (EP) | A61K/49/00 |
| 0632002 | * 1/1995 | (EP) . | |
| 6-212148 | * 8/1994 | (JP) . | |
| 7-173461 | * 7/1995 | (JP) . | |
| 91/16390 | * 10/1991 | (WO) . | |
| 94/00529 | * 1/1994 | (WO) . | |
| 95/08602 | * 3/1995 | (WO) . | |
| 95/08603 | * 3/1995 | (WO) . | |

OTHER PUBLICATIONS

Sand et al, "Modelled performance of non–chlorinated substitutes for CFC11 and CFC12 in centrifugal chillers", Int. J. Refrig., vol. 17, No. 1, pp. 40–48. No month available 1994.*

\* cited by examiner

*Primary Examiner*—Margaret Einsmann
(74) *Attorney, Agent, or Firm*—Gifford, Krass, Groh, Sprinkle, Anderson & Citkowski, P.C.

(57) ABSTRACT

A refrigerant composition which is suitable as a substitute for conventional refrigerant R12 in a vapour compression system employing a centrifugal compressor, comprises a mixture of tetraflouroethane and at least one additional refrigerant. The refrigerant mixture has a vapour density which renders it suitable for use as an R12 replacement in a centrifugal compression refrigeration system. The molecular weight of the mixture approximates 121. Preferred mixtures include 67 wt. % tetraflouroethane and 33 wt. % octafluoropropane; 69 wt. % tetrafluoroethane and 31 wt. % octafluorocyclobutane; and 66 wt. % tetrafluoroethane and 34 wt. % heptafluoropropane. Refrigeration effect and coefficient of performance are similar to R12.

6 Claims, 5 Drawing Sheets

CENTRIFUGAL COMPRESSION REFRIGERANT COMPOSITION

FIELD OF THE INVENTION

The present invention relates to a refrigerant composition for use as a refrigerant R12 replacement in a vapour compression refrigeration system employing a centrifugal compressor, and which is of good environmental acceptability.

BACKGROUND

Chlorofluorocarbon (CFC) gases, such as refrigerant R12 ($CCl_2F_2$), have been used for many years as refrigerants and are especially used in domestic refrigerators and vehicle air conditioning systems. However, there is now considerable concern that these CFC gases are involved in the reduction of stratospheric ozone levels and this has led to proposed restrictions and prohibitions on certain CFCs.

A range of less environmentally damaging replacement refrigerants have been proposed and are being utilised. One such replacement refrigerant which is being used to replace R12 is tetrafluoroethane R134a, ($CH_2F.CF_3$) which has properties very similar to R12 in terms of pressure-temperature relationship and refrigerating effect. Provided the correct lubricant is used, R134a is a good substitute for R12 in systems using positive displacement compressors. However, this is not the case in refrigeration systems which employ centrifugal compressors.

In a refrigeration system which employs a centrifugal compressor, the pressure required to condense the refrigerant is produced by dynamic means in a rotating impeller. The rotating impeller produces a pressure proportional to: a) the vapour density of the refrigerant, which is in turn proportional to the molecular weight of the refrigerant; b) the radius of the impeller; and c) the square of the rotational speed.

The molecular weight of R12 is 121 and the molecular weight of R134a is 102. Thus, while the condensing pressures of R12 and R134a are similar, it is clear that a centrifugal compressor designed to operate on R12 will not produce sufficient pressure to condense R134a at the design temperatures required. Typically this has been overcome by changing the impeller dimensions and increasing the rotational speed of the impeller to compensate for the reduced molecular weight of R134a. However this is an expensive procedure.

It is an object of the present invention to provide a refrigerant composition which mitigates the above disadvantage, and provides a refrigerant composition suitable for use as an R12 replacement in a centrifugal compression refrigeration system without substantially changing the impeller or the rotational speed.

Blends of large numbers of refrigerants are disclosed in WO92/01762 but the problems addressed by the present invention are not considered.

SUMMARY OF THE INVENTION

According to the present invention there is provided a refrigerant composition which comprises a mixture of tetrafluoroethane and least one additional refrigerant, wherein the refrigerant mixture has a vapour density which renders it suitable for use as a refrigerant R12 replacement in a centrifugal compression refrigeration system.

A further aspect of the present invention provides a centrifugal compression method of refrigeration which employs the composition as a refrigerant medium.

A still further aspect provides a vapour compression refrigeration apparatus having a centrifugal compressor, which employs the composition as a refrigerant medium.

In order to allow the composition to be used as a replacement for refrigerant R12 in a centrifugal compression refrigeration system, the refrigerant mixture requires to have a combined molecular weight of refrigerants in the refrigerant composition approximating to 121, which is the molecular weight of R12. Mixtures of vapours generally behave as a single substance having a molecular weight dependent on the mole fractions of the components of the mixture. Thus, it is possible by adding appropriate proportions of higher molecular weight additional refrigerant, to provide a refrigerant composition mixture with any suitable combined molecular weight.

One of the refrigerants is tetrafluoroethane, usually in its isomeric form R134a ($CH_2F.CF_3$-1-fluoro-2-trifluoroethane). Generally R134a forms the bulk or major component of the mixture, with the additional refrigerant or refrigerants forming a lesser amount. Typically R134a comprises 40–95%, especially 50–90%, and more especially 60–70% by weight or the mixture.

The molecular weight of R134a is 102. Thus, it is necessary to add appropriate proportions of higher molecular weight refrigerants in order to provide a refrigerant mixture with a combined molecular weight approximating to 121.

Particularly preferred additional refrigerants for use in combination with R134a are octafluoropropane (R218), heptafluoropropane (R227ea or R227ca) and octafluorocyclobutane (C318). R218 has a molecular weight of 188, R227 has a molecular weight of 170, and C318 has a molecular weight of 200. Typically the octafluoropropane or heptafluoropropane may be present in an amount of up to 40%, typically up to 30% by weight (e.g. up to 25%). The octafluorocyclobutane may be present in an amount of up to 40% (e.g. up to 35%) and a preferred range is 30–40% by weight.

Heptafluoropropane (R227) exists as two isomers $CF_3.CHF.CF_3$, (R227ea) and $CF_3.CF_2.CHF_3$ (R227ca).

While it is desirable to provide a refrigerant composition with the combined molecular weights of refrigerants in the composition approximating to that of R12 (namely, 121), the skilled man will appreciate that other refrigeration factors such as changes in required condensing pressure and differences in boiling temperatures between the refrigerants, need also to be considered.

For example, a refrigerant composition comprising a mixture of 67% R134a and 33% R218 will have a combined refrigerant molecular weight of about 121 (the same as R12). Such a mixture will therefore behave in a centrifugal compression refrigerating system, in terms of pressure produced, exactly as if it were R12 alone. However the addition of R218 will cause increases in the required condensing pressure and also the boiling of the mixture will result in a vapour fraction richer in R218 than in the liquid refrigerant mixture. Thus, it has been found that a refrigerant composition comprising a mixture of 80% R134a and 20% R218 (molecular weight 112) would provide a nearer approximation to the behaviour of R12 in a centrifugal refrigeration system and is therefor more appropriate.

Correspondingly, a refrigerant composition comprising a mixture of about 66 wt % R134a and 34 wt % R227 will have a combined molecular weight of about 121.

In a further example, a particularly preferred refrigerant composition which comprises a vapour refrigerant mixture of 69% R134a and 31% C318 would also have a combined refrigerant molecular weight of about 121. C318 condenses at pressures significantly lower than that of R12 and does not raise the condensing pressure as much as additions of R218. However in the resulting mixture, the R134a tends to boil off preferentially with the result that the mixture needs to be more rich in C318 to provide an appropriate pressure-temperature relationship for the refrigerant mixture being evaporated.

Generally speaking the refrigerant composition has a combined molecular weight of the refrigerants in the composition of 111 to 131, more preferably 116–126 and most preferably 119–123.

The boiling point of the additional refrigerant(s) should be close to that of R134a (bp–26° C.) to minimise fractionation of the composition on boiling, and is generally in the range—5° C. to −40° C. Boiling points are as follows:

| | |
|---|---|
| R218 | −36.5 |
| R227ea | −18° C. |
| R227ca | −17° C. |
| C318 | −6° C. |

In order to provide a refrigerant composition of suitable properties, it may be desirable to include two or more additional refrigerants. This allows finer percentage modifications of each of the refrigerants in the mixture, such that the mixture may produce a vapour which has a similar molecular weight to that of the liquid and other desirable properties are maintained.

According to a particular embodiment of the present invention there is provided a refrigerant composition suitable for use as an R12 replacement in a centrifugal compression refrigeration system, which comprises a mixture of the following components:

i) 50 to 90 wt % tetrafluoroethane (R134a);
ii) 1 to 40 wt % octafluorocyclobutane (C318) and optionally upto 30 wt % octafluoropropane (R218) and/or heptafluoropropane (R227).

DETAILED DESCRIPTION OF PREFERRED EMBODIMENTS

Embodiments of the invention will now be described by way of example only with reference to the drawings wherein:

FIG. 1 shows a comparison of vapour pressures of a composition RX5 (invention) with conventional refrigerant R12 (comparison);

FIG. 2 and 3 gives a comparison of refrigerating effect and coefficient of performance for composition RX5 (invention) and refrigerant R12 (comparison) condensing at +40° C.;

FIGS. 4 and 5 give a comparison of refrigerating effect and coefficient of performance for composition RX5 (invention) and refrigerant R12 (comparison) condensing at +55° C.

FIG. 1 shows the variation of vapour pressure with temperature for composition RX5 and conventional refrigerant R12. RX5 is a composition according to the present invention comprising R134a and C318 in the following proportions by weight:

R134a −69.3
C318−30.7
(combined molecular weight approximately 121)

The data was obtained using methods well known to the skilled man. Basically, a fixed amount of refrigerant was placed in a sealed volume and heated to the specified temperature. The pressure was then noted. It can be seen that the pressure-temperature curve for RX5 (invention) shown by a full line closely approximates that for conventional R12 (dotted line). Thus, the behaviour of RX5 under compression should closely approximate that of R12.

Figure 1:
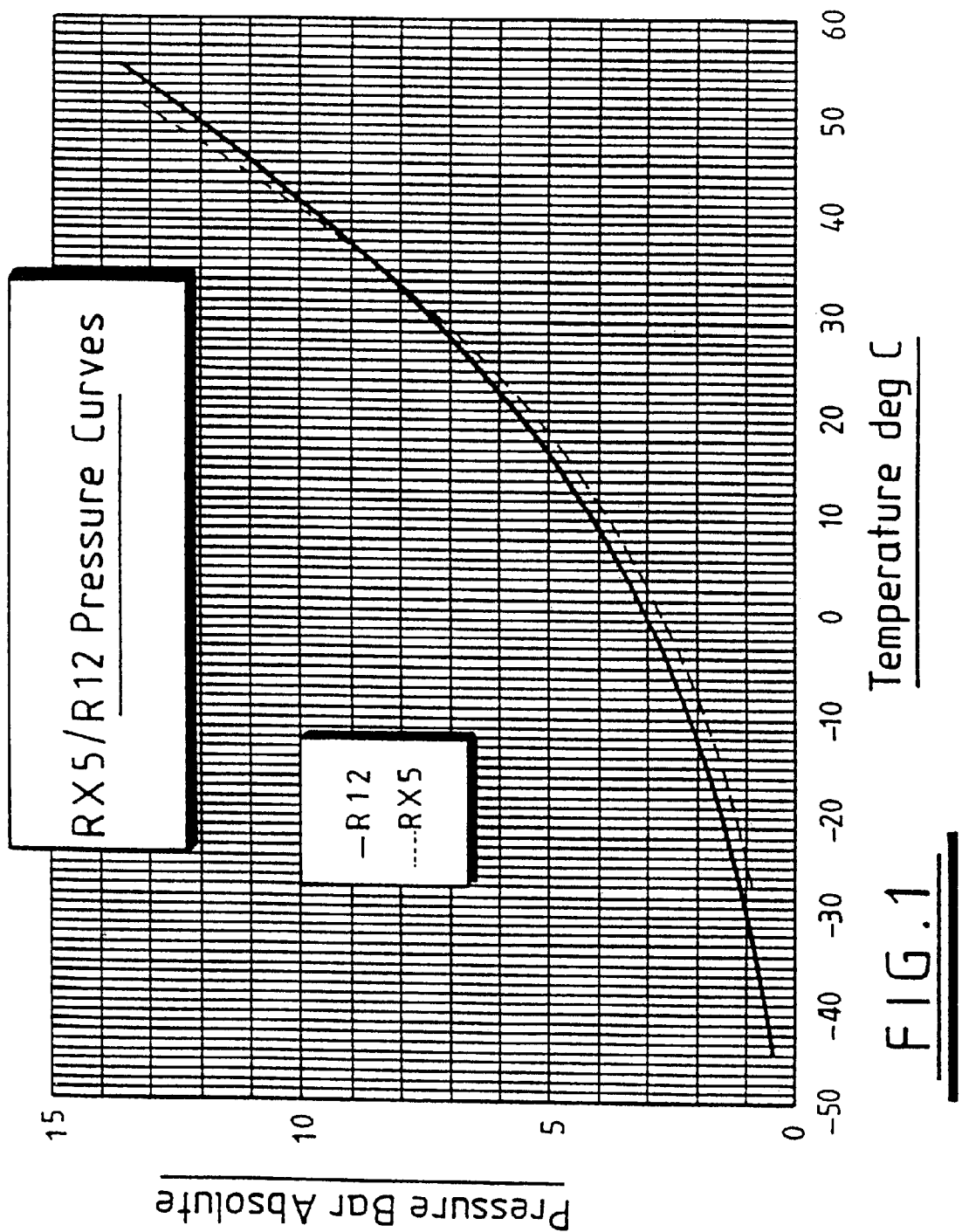
Figure 2:
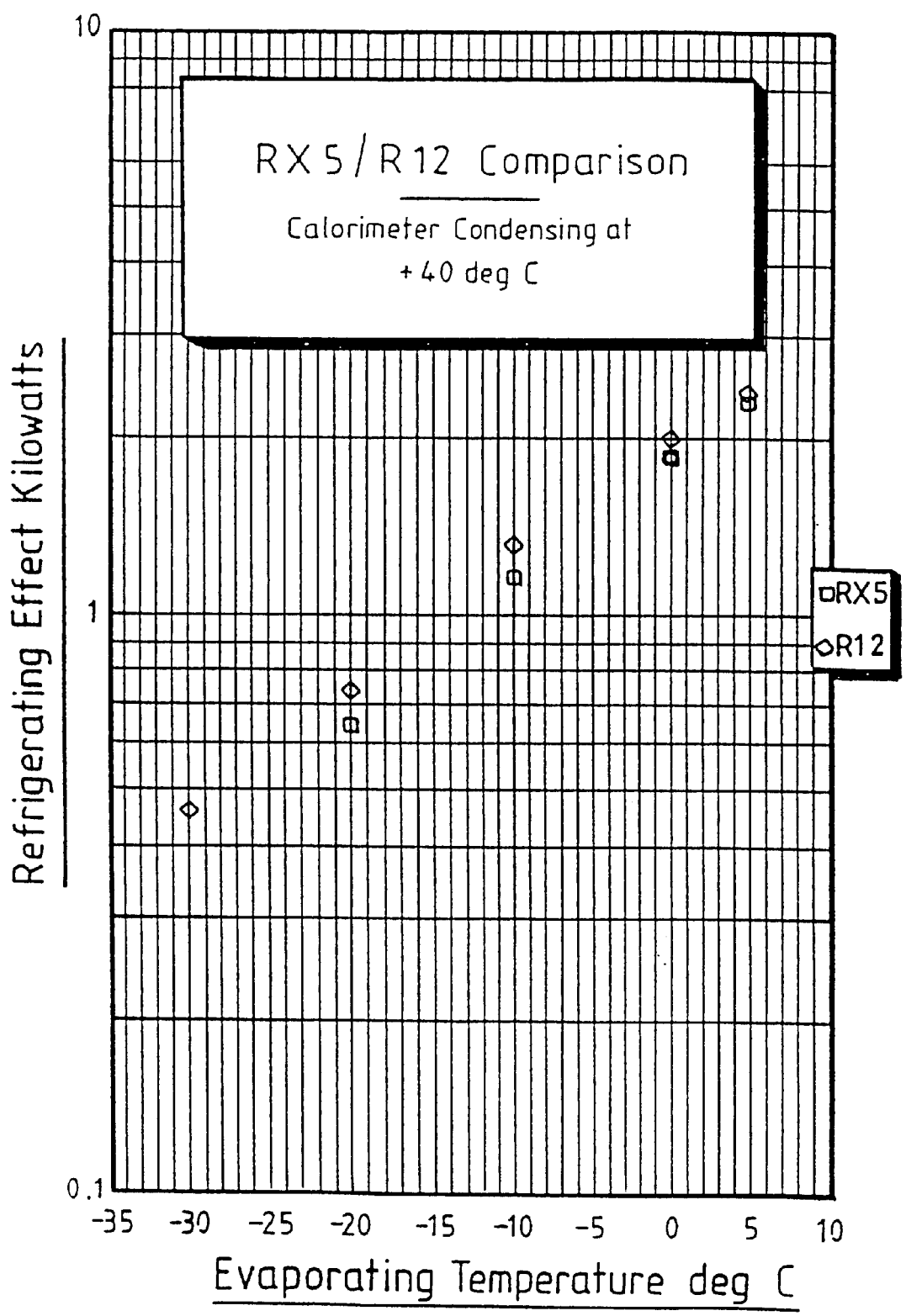
FIG. 2 is a comparison of refrigerating effect (kilowatts) for RX5 (invention) and conventional refrigerant R12. The data shows the variation of refrigerating effect with respect to evaporating temperature at a calorimeter condensing temperature of +40° C. over the whole temperature range, the refrigerating effect of RX5 (invention) approximates that of R12.
Figure 3:
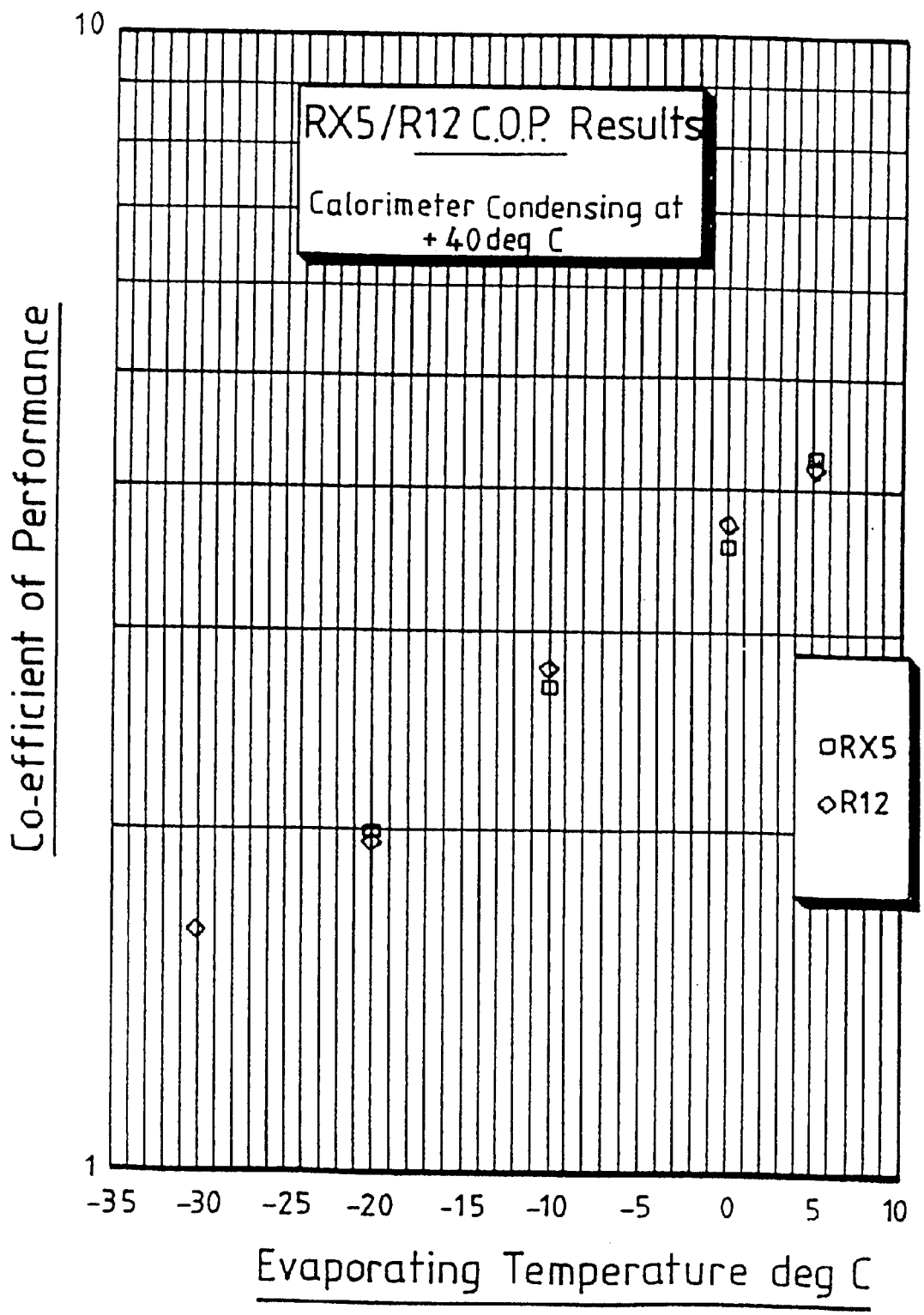
FIG. 3 shows a comparison of the variation of coefficient of performance (C.O.P.) with evaporating temperature for RX5 (invention) and conventional refrigerant R12 at a calorimeter condensing temperature of +40° C.
Figure 4:
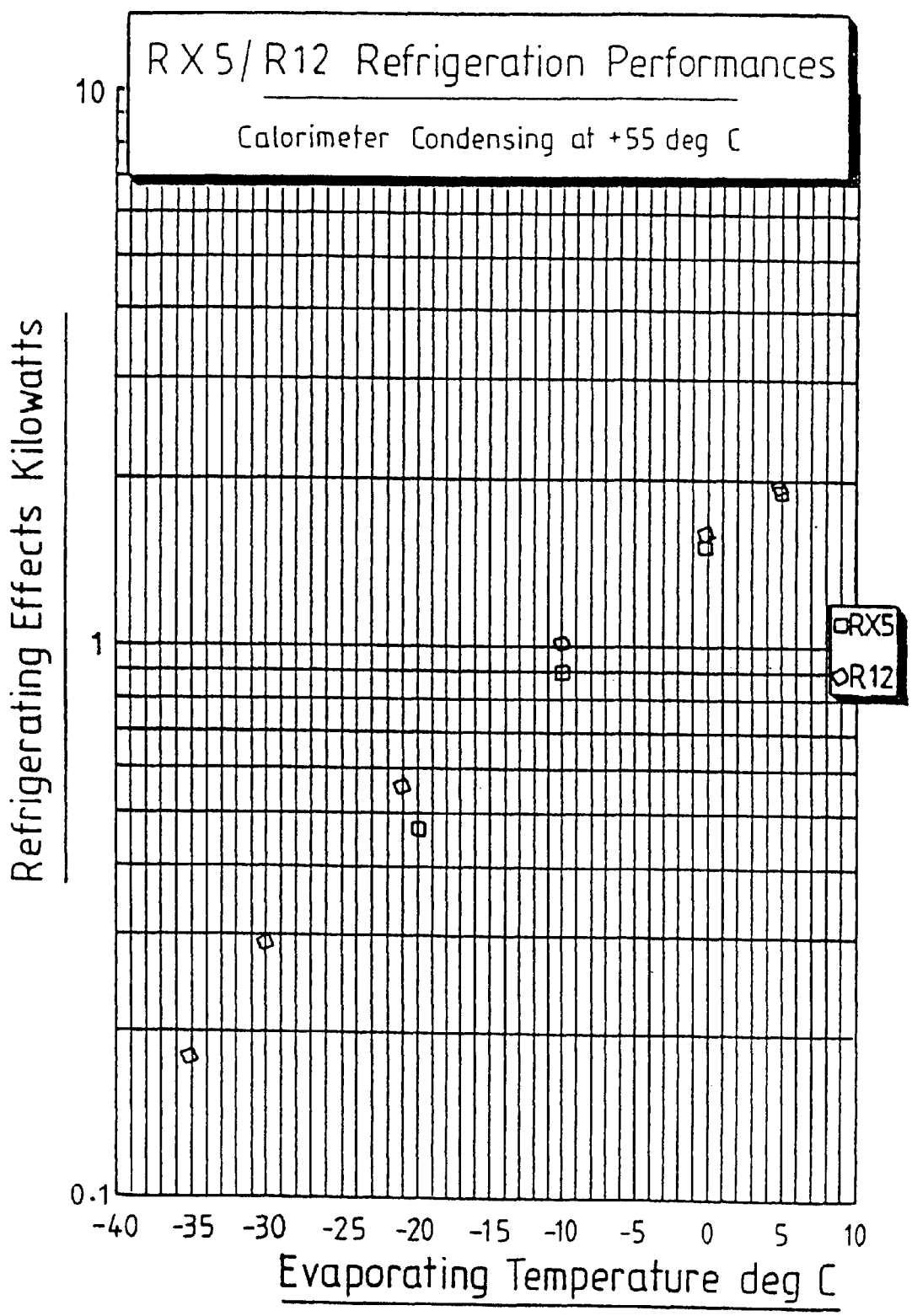
FIGS. 4 and 5 show analogous comparisons of refrigerating effect and coefficient of performance respectively, at calorimeter condensing temperatures of +55° C.
Figure 5:
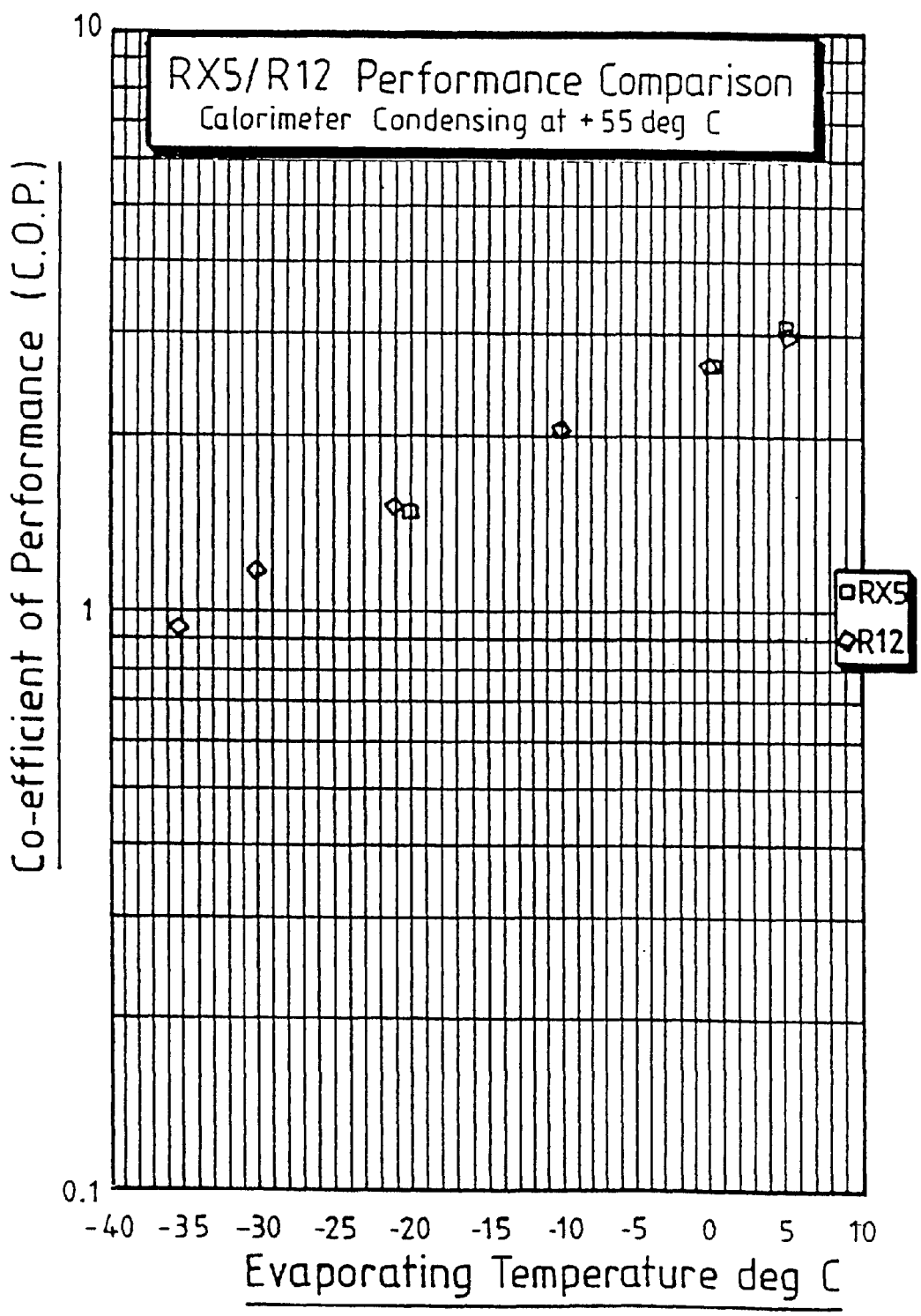

The refrigerating effect (FIGS. 2 and 4) of the refrigerant is measured using a calorimeter and methodology as described in "Automatic Calorimeter for Mixed Refrigerants" S. F. Pearson, 19th International Congress of Refrigeration 1995; Proceedings Volume IVa. This measured data is used to determine coefficients of performance (FIGS. 3 and 5).

Briefly the refrigerating effect was determined by measuring the electrical input to a secondary refrigerant calorimeter. The refrigerant under test is compressed using a compressor in a vapour compression system. The refrigerant is condensed in a water cooled condenser at a selected condenser temperature (40° C. or 55° C.). From the condenser the liquid refrigerant is passed through an expansion valve and the evaporating temperature downstream thereof is noted. The evaporating temperature may be varied by varying the amount of refrigerant charged into the system. The associated refrigerating effect produced is measured in the secondary refrigerant calorimeter, wherein the required electrical input to counter-balance the refrigerating effect produced is measured (kw).

It can be seen that the refrigerating effect and coefficient of performance relationships for RX5 (invention) and conventional refrigerant R12 are closely similar. Thus the refrigerant of the present invention can be substituted for R12 in existing refrigeration equipment without substantial change in systems employing either reciprocating or centrifugal compressors.

What is claimed is:

1. A method of using a two-component refrigerant composition in a centrifugal compression refrigeration system specifically designed to use refrigerant R12, the method comprising:

providing a mixture of 40–70 weight percent 1,1,1,2-tetrafluoroethane (R134a) and the balance being selected from a group consisting of heptafluoropropane and octafluorocyclobutane; and introducing said two-component composition into a centrifugal compression refrigeration system designed to use refrigerant R12.

2. The method of claim 1 further comprising the step of removing an existing quantity of refrigerant R12 from said centrifugal compression refrigeration system and replacing it with a corresponding quantity of the two-component refrigerant composition.

3. The method of claim 1 further comprising the step of providing the R134a in an amount between 50–70 weight percent.

4. The method of claim 1 further comprising the step of providing the heptafluoropropane in an amount up to 40 weight percent.

5. The method of claim 1 further comprising the step of providing the heptafluoropropane as $CF_3.CHF.CF_3$ (R227ea).

6. The method of claim 1 further comprising the step of providing the R134a at 66 weight percent and the heptafluoropropane at 34 weight percent.

* * * * *